US005589298A

United States Patent [19]
Takada et al.

[11] Patent Number: 5,589,298
[45] Date of Patent: Dec. 31, 1996

[54] ELECTROCHEMICAL DEVICES COMPRISING LITHIUM NITRIDE-METAL COMPOUNDS IN AT LEAST ONE OF A PAIR OF ELECTRODES

[75] Inventors: Kazunori Takada, Osaka; Shigeo Kondo, Hirakata; Osamu Yamamoto, Ichinomiya; Motoaki Nishijima, Mie-ken, all of Japan

[73] Assignee: Matsushita Electric Industrial Co., Ltd., Osaka, Japan

[21] Appl. No.: 302,300

[22] Filed: Sep. 8, 1994

[30] Foreign Application Priority Data

Sep. 9, 1993 [JP] Japan ................... 5-224281

[51] Int. Cl.$^6$ ........................ H01M 4/02
[52] U.S. Cl. .............. 429/218; 429/220; 429/221; 429/223; 429/224; 361/311; 361/330; 361/326; 40/448; 40/453; 40/477
[58] Field of Search ..................... 429/218, 223, 429/221, 220, 224; 361/326, 330, 311; 40/448, 453, 477

[56] References Cited

U.S. PATENT DOCUMENTS 4,547,046  10/1985  Muramatsu et al. .............. 350/357
4,888,258  12/1989  Resjardin et al. ................ 429/194

FOREIGN PATENT DOCUMENTS 0281352   9/1988   European Pat. Off. .
56-091374  7/1981   Japan .
56-103872  8/1981   Japan .

OTHER PUBLICATIONS

"Li Dexthcolation and Structural Change in Lithium transition Metal Nitride Li$_3$FeN$_2$", Takeda et al. Feb. 11, 1994, vol. 113, Nov. 94.

Chemical Abstract 101:237179.
"An Electric Double Layer Capacitor with High Capacitance and Low Resistance"; 41st Electronic Corp. & Tech., 1991 pp. 531–536 (month N/A).
Mat. Res. Bull., vol. 19, pp. 1251–1255, 1984, US, A. Le Mehaute et al., "Quelques Exemples de Composes d'Insertion du Lithium Presentant un Transfert de Charge Partiel Avec le Reseau Initial" (month N/A).
Chemical Abstracts, vol. 117, No. 16, Oct. 19, 1992, p. 748, Columbus, Ohio, US; abstract No. 161725q, V. Ivanov et al., "Prognosis Of Inorganic Cation Conductors Of AaBVII-I-aX4 (a=2, 5, 6) And A7BVY4 From Geometric Criteria For A3BVY4".
Journal of the Less–Common Metals, 161, 1990, p. 35, "Li$_3$FeN$_2$, A Ternary Nitride With . . . Chains: Crystal Structure And Magnetic Properties"(month N/A).
"Li$_3$FeN$_2$, A Ternary Nitride With $_\infty^1$[FeN$_{4/2}^{3-}$]Chains: Crystal Structure and Magnetic Properties" by A. Gudat et al; Journal of the Less–Common Metals, 161(1990); pp., 31–36 (month N/A).
"Ternary Lithium Nitrides with Elements Cr, Mo and W" by A. Gudat et al; Z. Naturforsch, 45b; 1990; pp., 111–120 (month N/A).

*Primary Examiner*—M. Nuzzolillo
*Attorney, Agent, or Firm*—Lowe, Price, LeBlanc & Becker

[57] ABSTRACT

Electrochemical devices comprise at least a pair of electrodes and a lithium ion conductive electrolyte provided between the pair of electrodes. At least one of the electrodes comprises a lithium nitride-metal compound having a one-dimensional chain structure. By this, the number of end groups which greatly take part in characteristic degradation of the device can be reduced significantly, ensuring good characteristic properties. The devices include lithium secondary cells, electric double-layer capacitors, and electrochemical display devices.

66 Claims, 6 Drawing Sheets

ELECTROCHEMICAL DEVICES COMPRISING LITHIUM NITRIDE-METAL COMPOUNDS IN AT LEAST ONE OF A PAIR OF ELECTRODES

BACKGROUND OF THE INVENTION

1. Field of the Invention

This invention relates to electrochemical devices including, for example, lithium secondary cells and more particularly, to electrochemical devices which make use of lithium nitride-metal compounds as at least one electrode thereof.

2. Description of the Prior Art

Investigations have been hitherto made on transition metal oxides such as, for example, $Li_xCoO_2$, $Li_xNiO_2$, $Li_xMnO_2$ and the like, for use as an active material for the positive electrode of lithium secondary cells. Likewise, substances having various types of layered structures, such as graphite, have been studied for use as an active substance for the negative electrode.

Where these substances are, respectively, employed as the active substance for the electrodes, their crystal structures greatly influence the electrochemical oxidation and reduction cycles of the cell. For instance, the crystal structure of the transition metal oxide such as $LiNiO_2$ is a kind of layered structure wherein infinite chains of edge- or apex-sharing tetrahedra or octahedra, in which transition metal element ions are bonded with oxygen ions through six or four coordinations, extend two-dimensionally. In the layered structure, lithium elements are intercalated. When a substance having such a layered structure as mentioned above is subjected to electrochemical polarization, lithium ions are intercalated in or de-intercalated from the layered structure and act as an active substance for the electrode.

In case where substances having the layered structure as mentioned above are used as an active substance for electrode, the electrochemical reaction which takes place will be a so-called topochemical reaction wherein ions are merely intercalated in or de-intercalated from the crystal layers of the layered structure. As a consequence, any appreciable change in the crystal structure does not take place, so that high reversibility is ensured with respect to the repetition of the electrochemical redox reaction cycles.

However, the use of the transition metal oxides as the active substance has the following problems to solve.

The crystals of transition metal oxides and graphite have such a two-dimensional structure as set out hereinabove. The materials used as the active substance have a limited, finite dimension. The two-dimensional structure breaks off on the surface of the material. With transition metal oxides such as $LiNiO_2$, the oxygen ions become "terminated", for example, in the form of —OH, —OLi or other end groups.

If these materials are used as the active substance, the electrochemical reactions include not only the intercalation and de-intercalation reaction of $Li^+$ ions relative to the crystal layers, but also additional reactions ascribed to the $H^+$ and/or $Li^+$ ions of the end groups. This surface state may change during the working cycles of the electrochemical cell or during storage of the cell. This will result in the formation of end groups which are liable to impede the intercalation and/or de-intercalation reaction of the $Li^+$ ions, thus bringing about an increase in impedance of the interface between the electrodes and the electrolyte. Hence, the electrochemical reaction does not proceed smoothly. With the cell, the degradation of performances such as a lowering of charge and discharge capacities will result.

The transition metal oxides have been described as having a layered structure. Graphite also has a layered structure wherein hexagons of $C_6$ extend two-dimensionally. More particularly, graphite has such a surface state that has end groups, such as quinone groups, ketone groups and the like groups, bonded thereto. Graphite materials have been heretofore investigated for use as an active material for the negative electrode of lithium secondary cells. Like the transition metal oxides, changes take place in the end groups after repetition of the charge and discharge cycles, resulting in the degradation of performance of the cell. In addition, the type of end group depends greatly on the history of the graphite. This will bring about various side reactions which will occur along with the intended charge and discharge reactions. This presents the following problems.

In general, the end groups in or on the graphite surfaces are, in most cases, liable to suffer electrochemical reduction. At the first charge reaction, gases will be generated owing to the electrochemical reduction of the end groups and an electrolyte. Eventually, the inner pressure of the cell undesirably increases at the initial stage of the charge cycle.

As will be appreciated from the problems involved in the transition metal oxides and graphite, where materials having a layered structure are used as active substances to constitute electrochemical cells, there arises the problem that the performance of the cell is degraded owing to the reactions in which end groups take part.

SUMMARY OF THE INVENTION

It is accordingly an object of the invention to provide electrochemical devices which overcome the problems of the prior art ascribed to the reactions of end groups of active substances.

It is another object of the invention to provide electrochemical devices which make use of lithium nitride-metal compounds as an active substance for electrodes.

It is a further object of the invention to provide electrochemical devices including, for example, lithium secondary cells, electric double layer capacitors and electrochemical display devices.

According to a broad aspect of the invention, there is provided an electrochemical device which comprises at least a pair of electrodes and a lithium ion conductive electrolyte provided between the pair of electrodes, wherein at least one of the electrodes comprises a lithium nitride-metal compound. Preferably, the at least one electrode consists essentially of the lithium nitride-metal compound.

The electrochemical device according to the invention may be a lithium secondary cell, an electrochemical display device or an electric double layer capacitor.

More particularly, according to a more specific embodiment of the invention, there is also provided a lithium secondary cell which comprises a cell unit including a pair of electrodes, a separator provided between the pair of electrodes, and a liquid electrolyte impregnated in the separator and capable of lithium ion conduction, wherein at least one electrode comprises a lithium nitride-metal compound. As a matter of course, either a negative electrode or a positive electrode may be made of the lithium nitride-metal compound, or both electrodes may be made of the nitride-metal compound whereby good charge and discharge cycle characteristics can be attained.

According to another specific embodiment of the invention, there is provided an electrochemical display device which comprises an electrically insulating substrate, a transparent electrode and a display electrode formed on the substrate in this order, and a counter electrode associated with the display electrode through an electrolyte and capable of color development on application of pulse voltages, wherein the counter electrode comprises a lithium nitride-metal compound.

According to a further embodiment of the invention, there is provided an electric double layer capacitor which comprises a unit including a non-polar electrode, a polar electrode spaced apart from the non-polar electrode, a separator provided between the non-polar electrode and the polar electrode, and an electrolyte impregnated in the separator and capable of lithium ion conduction, wherein the non-polar electrode comprises a lithium nitride-metal compound.

PREFERRED EMBODIMENTS OF THE INVENTION

In the practice of the invention, there are provided electrochemical devices which have at least a pair of electrodes and a lithium ion conductive electrolyte provided between the electrodes. In the devices, it is essential to use lithium nitride-metal compounds as an active substance for at least one of electrodes. The lithium nitride-metal compounds typically include ternary lithium nitrides with an element such as Fe, Co, Cu, Mn, Cr, V, Mo, Sr, Ni, Ti and the like. Aside from these elements, ternary lithium nitrides with an element such as W, Nb or the like may likewise be used. In addition, quaternary or multiple-component lithium nitrides with two or more elements as set out above may also be used in the present invention.

Lithium nitride-metal compounds have a one-dimensional chain structure of nitride-metal ions wherein lithium ions exist inbetween the one-dimensional chains. With lithium nitridoferrate, for example, tetrahedra of $[FeN_2]^{3-}$ form a one-dimensional chain. Accordingly, an end group is present only at opposite sides of the one-dimensional chain of the tetrahedra. This eventually leads to a reduced number of the end groups as compared with materials having a two-dimensional layered structure. Thus, the influence of the end groups can be significantly reduced.

When these materials are used as an active substance for electrodes of electrochemical devices, there can be obtained the devices which exhibit good charge and discharge cycle characteristics while suppressing the problem as will be caused by side reactions in which the end groups take part.

Examples of the ternary or multi-component lithium nitride-metal compounds as set out hereinbefore include compounds which are known in the art and include (1) superstructures of the fluorite structure such as $Li_5TiN_3$, $Li_7VN_4$, $Li_{15}Cr_2N_9$, $Li_7MnN_4$, $Li_6MoN_4$, $Li_6CrN_3Sr_3Ni_4N_4$, $Li_5MnN_3$ and the like, (2) solid solutions of the $Li_3N$ structure such as $Li_3FeN_2$, $Li_3MnN_2$, and intermediate phases of the ternary nitrides with an element such as $Li_{2+x}M_{1-x}N$ wherein M represents Co, Ni, Cu, Fe or the like, x is in the range of 0 to 1. More particularly, the ternary or multi-component lithium nitrides with at least one element may be those containing at least one element selected from Fe, Co, Cu, Mn, Cr, V, Mo, Sr, Ni, W and Nb. Of these, $Li_3FeN_2$, $Li_3MnN_2$, $Li_2NiN$, $Li_2CuN$ and the like are preferred in view of the availability. $Li_3FeN_2$ is more preferred.

These lithium nitride-metal compounds may be prepared by any known procedures as described, for example, in Journal of The Less-Common Metals, 161 (1990) 31–36. The preparation of several specific compounds is particularly described in examples.

Figure 1:
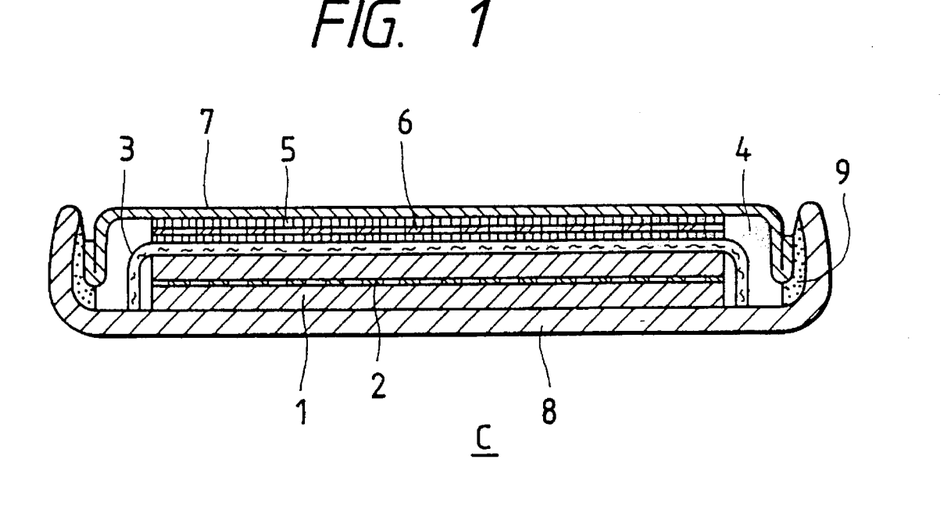
FIG. 1 is a schematic sectional view of a lithium secondary cell according to one embodiment of the invention.

Reference is now made to the accompanying drawings and particularly to FIG. 1.

In FIG. 1, there is generally shown a lithium secondary cell C which includes a negative electrode 1 having a mesh 2 of a metal, such as nickel, which holds the negative electrode 1 therewith and serves as a current collector. A positive electrode 5 is placed in face-to-face relation with the negative electrode 1 through a separator 3 which is impregnated with an electrolyte 4. The positive electrode 5 has a mesh 6 of a metal, such as high chromium stainless steel, which holds the positive electrode suitably and serves as a current collector. The negative and positive electrodes 1, 5 and the separator 3 impregnated with the electrolyte 4 are hermetically sealed and encased in a casing. In FIG. 1, a metal cover 7 is caulked with a metal casing 8 through a gasket 9 to complete the hermetic sealing.

In the practice of the invention, at least one of the electrodes should contain a lithium nitride-metal compound.

For instance, when the negative electrode 1 is designed to contain the nitride-metal compound, the nitride-metal compound is mixed with a conductive material such as graphite, carbon, metal powders or the like in an amount of up to 20 wt %, preferably 2 to 15 wt %, based on the nitride-metal compound. To the mixture is further added a resin binder such as a fluorine resin, various types of synthetic resins including block copolymers or the like, in an amount of up to 20 wt %, preferably from 2 to 15 wt %, based on the nitride-metal compound, thereby obtaining a composition for the negative electrode. This composition is applied to the metallic mesh 6 and press molded to obtain the negative electrode 1 having, for example, a disk form. The composition should preferably contain the nitride-metal compound in an amount not less than 60 wt %. If desired and preferably in some case, the negative electrode may be made of the nitride-metal compound alone as press molded in the metal mesh 2.

The positive electrode may be made of active substances for positive electrode ordinarily used in lithium secondary cells. Such active substances may be transition metal oxides such as $LiCoO_2$, $LiNiO_2$, $LiMnO_2$ and the like. In practice, such an active substance is mixed with a conductive material such as fibrous graphite, carbon, metallic powders or the like, along with a resin binder such as a fluorine resin in amounts ordinarily used in the art. The resultant composition is applied to a metallic mesh and press molded to obtain a positive electrode as usual.

As a matter of course, the active substance for the positive electrode may be made of a nitride-metal compound, to which a conductive material such as fibrous graphite or metallic powder and a binder resin such as polytetrafluoroethylene are further added, like the negative electrode as set out hereinabove. In this case, the negative electrode may be made of a metallic lithium foil although the transition metal oxides of lithium as illustrated with respect to the positive electrode nay also be used.

Moreover, the active substances for both negative and positive electrodes may, respectively, contain a nitride-metal compound of the type mentioned hereinbefore. The same or difference nitride-metal compounds may be used for both electrodes.

If it is desired not to add any conductive material and any binder resin, the nitride-metal compound in the form of a powder may be supported with a metallic mesh merely by press molding as set out hereinabove.

The separator 3 may be made of finely porous films or membranes which are made, for example, of thermoplastic resins such as polypropylene, polyethylene and the like and glass. The separator may have a thickness of 5 to 200 μm.

The electrolyte 4 impregnated in the separator 3 is not critical and may be ones which are ordinarily used for this purpose provided that lithium ions are releasable for ionic conduction. Examples of the electrolyte include lithium phosphorus hexafluoride ($LiPF_6$) dissolved in solvents such as propylene carbonate, dimethoxyethane, γ-butyrolactone, ethylene carbonate, tetrahydrofuran and mixtures thereof. Aside from lithium phosphorus hexafluoride ($LiPF_6$), there may be used lithium boron tetrafluoride, ($LiBF_4$), lithium perchlorate ($LiClO_4$) and the like. The solute is usually present in the electrolyte in an amount of 0.5 to 3 moles per liter of the solvent.

Figure 2:
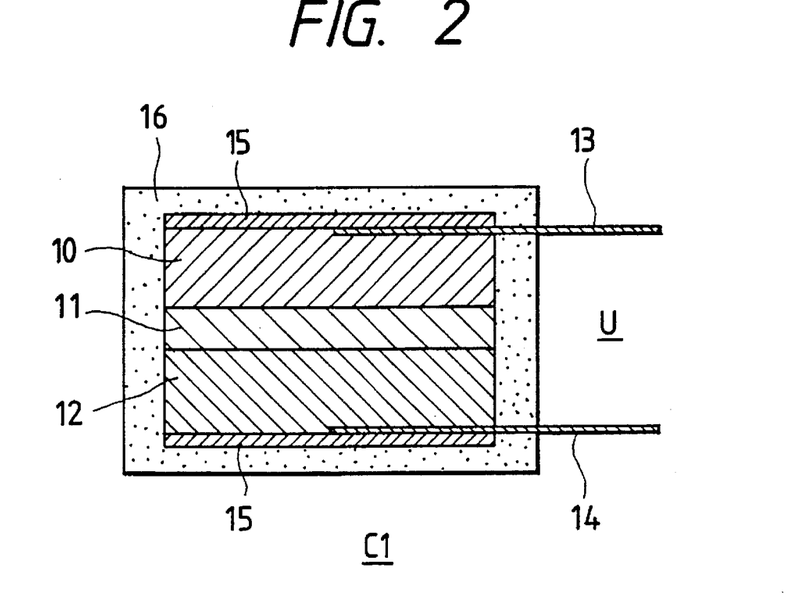
FIG. 2 is a schematic sectional view of a solid state lithium secondary cell according to another embodiment of the invention.

FIG. 2 schematically shows, in section, a solid state lithium secondary cell C1 which includes a positive electrode 10, a solid electrolyte layer 11 and a negative electrode 12 arranged as shown in the figure. The positive and negative electrodes 10, 11 are, respectively, attached with lead terminals 13, 14 by use of a carbon paste 15 to provide a cell unit U. The cell unit U is sealed and entirely covered with a cured thermosetting resin such as an epoxy resin.

In this case, the positive and negative electrodes may be arranged in a manner similar to those electrodes set out with respect to FIG. 1. More particularly, either or both of the electrodes should be, respectively, made of a lithium nitride-metal compound. Moreover, as shown in Example 3, a solid electrolyte used in the solid electrolyte layer may be added to a positive electrode material up to 75 wt % of the electrode material, by which affinity for the electrolyte layer is improved. By the presence of the solid electrolyte in the positive electrode, smooth passage of an electric current through ionic conduction is ensured in the positive electrode.

Although not particularly shown in the figure, the active substances for the positive and negative electrodes 10, 11 are, respectively, held with a metallic mesh such as by press molding. The metallic mesh serves also as a current collector as in FIG. 1.

The solid electrolyte layer 11 should be a lithium-containing solid electrolyte capable of lithium ion conduction. Specific examples include an amorphous lithium ion conductive compound of the formula, $0.6Li_2S$-$0.4SiS_2$, $0.6Li_2S$-$0.4P_2S_6$, $0.6Li_2S$-$0.4B_2O_3$, and the like. Besides, lithium-containing polymeric solid electrolytes such as polyethylene oxide-$LiClO_4$, polyethylene oxide-$LiCF_3SO_3$ and the like may also be used in the practice of the invention. The solid electrolyte layer 11 consists essentially of the solid electrolyte of the type as mentioned above. If necessary, other materials such as fluorine resins, synthetic rubbers and the like binders may be added to the solid electrolyte in amounts up to 20 wt %.

Figure 3:
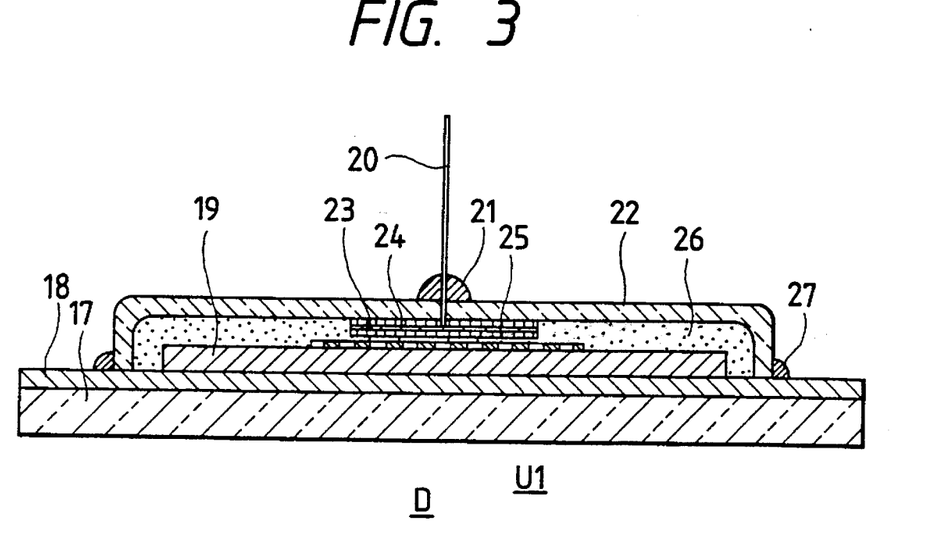
FIG. 3 is a schematic sectional view of an electrochemical display cell according to a further embodiment of the invention.

FIG. 3 schematically shows an electrochemical display device D. The device D includes a glass substrate 17 and a transparent electrode 18, such as of indium-tin oxide, formed on the substrate 17 by an electron beam vacuum deposition technique. A display electrode layer 19 is further formed on the transparent electrode 18.

A counter electrode unit U1 is mounted on the electrode layer 19 as shown. The electrode unit U1 has a metallic mesh 23 having a counter electrode 24 therein and a light reflecting sheet 25 made of a porous ceramic on which the metallic mesh 23 is mounted. The electrode unit U1 is impregnated with a liquid electrolyte 26. The electrode unit U1 and the liquid electrolyte 26 are fully covered with a glass casing 22 which is in contact with the transparent electrode 18. The glass casing 22 and the transparent electrode 18 are hermetically sealed by means of a UV-cured resin 27. The counter electrode unit U1 has a lead terminal 20 vertically extending through an opening (not shown) of the glass casing 22 and fixed with the casing 22 by use of a glass solder 21.

In the practice of the invention, the display electrode layer 19 is made of a compound such as tungsten oxide, molybdenum oxide, vanadium oxide and the like.

The counter electrode is made of a lithium nitridoferrate which is able to undergo a topochemical reaction, i.e. intercalation and de-intercalation reactions, by application, for example, of pulse voltages.

In the arrangement shown in FIG. 3, for example, the display electrode is made of a compound which is optically transparent and the counter electrode 24 in the electrode unit U1 is made of a lithium nitride-metal compound with or without a binder resin and a conductive material such as carbon powder as in the foregoing embodiments.

The electrochemical display device is not specific with respect to the structure thereof except that the counter electrode is made of a lithium nitride-metal compound capable of undergoing the topochemical reaction.

The porous ceramic sheet 25 is made of alumina, yttria or the like and can be used as a light reflector. The electrolyte used may be a solution of a lithium-containing compound such as, for example, $LiClO_4$, $LIPF_6$, $LiBF_4$ or the like, dissolved in a solvent such as propylene carbonate.

In operation, when pulse voltages are appropriately applied between the transparent electrode 18 and the counter electrode 24, color development topochemically takes place on the lithium nitridoferrate counter electrode 24. When tungsten oxide is used as the display electrode, for example, the following reaction takes place $$WO_{3+x} Li^+ + xe^- \Delta \rightarrow Li_xWO_3$$

In the left side of the reaction formula, the display electrode is in the bleached state and in the right side, color development takes place. In the counter electrode, the intercalation and de-intercalation reactions of the lithium ions occur.

When using a lithium nitride-metal compound as either or both of the counter electrode, the topochemical reaction cycles continue stably over a long time.

Figure 4:
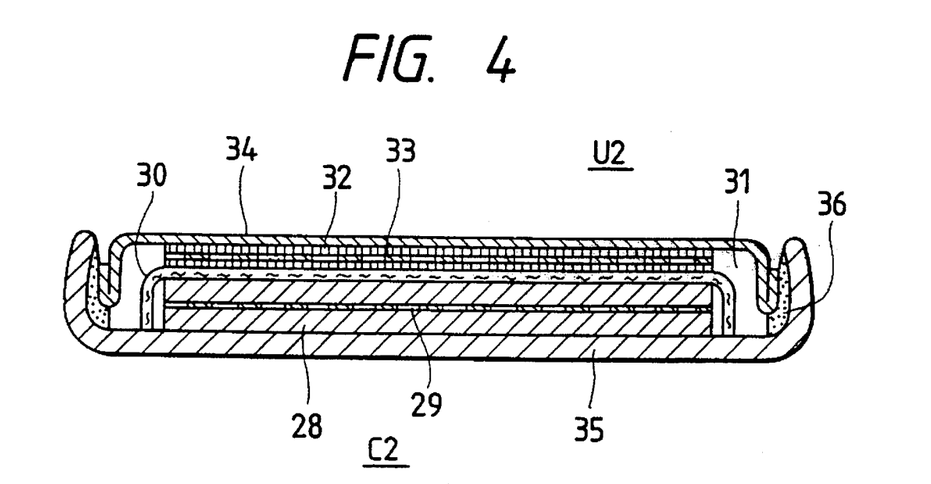
FIG. 4 is a schematic sectional view of an electric double layer capacitor according to a still further embodiment of the invention.

FIG. 4 schematically shows an electric double-layer capacitor generally indicated as C2. The capacitor C2 includes an electrode unit U2 which has a non-polar electrode 28 supported with a metallic mesh, such as a high chromium stainless steel mesh, serving also as a current collector, and a polar electrode 32 supported with a metallic mesh 33, such as a high chromium stainless steel mesh. A separator 30 is provided between the non-polar electrode 28 and the polar electrode 32 and is impregnated with a liquid electrolyte 31, thereby completing the electrode unit U2. The unit U2 is encased in a casing made, for example, of a stainless steel cover 34 and a stainless steel casing 35 which are combined together as shown and are hermetically sealed with a gasket 36.

The non-polar electrode 28 is, for example, made of a lithium nitride-metal compound as defined hereinbefore with respect to FIG. 1, along with a binder resin and a conductive material as set forth hereinbefore. The polar electrode 32 is made, for example, of a carbon material although any electrochemically inert materials may be used. Such a carbon material is usually mixed with up to 20 wt % of a binder resin such as a fluorine-containing resin, synthetic rubbers or the like.

The separator may be one which is used in the first embodiment and includes, for example, a thermoplastic resin fiber sheet. The electrolyte used may be one which has been defined in the foregoing embodiments.

In the above embodiment, the capacitor is, of course, of the polar type.

Several types of electrochemical devices which make use of lithium ion conductive electrolytes have been described including lithium secondary cells, electrochemical display devices, electric double layer capacitors and solid state electrolytic capacitors. With the lithium secondary cell, a great quantity of electricity is passed through the device during the course of working cycles. The changes of the end groups set forth hereinbefore greatly influence the performance of the device. Accordingly, the use of lithium nitride-metal compounds as an active substance for the cell device is more effective.

With the electrochemical display device and the electric double layer capacitor, the quantity of electricity during the working cycles is not so great. However, the working cycle has to be repeated in great number, so that the degradation of its performance is more liable to occur when the end groups suffer changes. In this sense, the use of lithium nitride-metal compounds is effective in suppressing the degradation.

The present invention is more particularly described by way of examples. Comparative examples are also shown.

EXAMPLE 1

In this example, a lithium secondary cell was made using lithium nitridoferrate of the formula, $Li_3FeN_2$, as an active substance for negative electrode.

The lithium nitridoferrate was prepared by mixing lithium nitride ($Li_3N$, commercially available guaranteed reagent) and metallic iron at a molar ratio of 1:1, placing the resultant mixture in an iron crucible, and firing in a nitrogen stream containing a small amount of hydrogen at 900° C. for 6 hours to obtain lithium nitridoferrate represented by $Li_3FeN_2$.

The thus obtained lithium nitridoferrate was mixed with 5 wt % of fibrous graphite used as a conductive martial and 1 wt % of a fluorine-containing resin binder thereby providing a negative electrode material for lithium secondary cell. 100 mg of the negative electrode material was set or packed in a metallic copper mesh disk with a diameter of 18 mmφ to obtain a negative electrode.

Lithium cobaltate ($LiCoO_2$) was used as a positive electrode material. Lithium cobaltate was prepared by mixing cobalt oxide and lithium carbonate at a molar ratio of 2:1 and firing in air at 700° C.

The thus prepared lithium cobaltate was mixed with 5 wt % of fibrous graphite and 1 wt % of a polytetrafluoroethylene binder to provide a positive electrode material. 1000 mg of the positive electrode material was packed in a high chromium stainless steel disk with a diameter of 18 mmφ to obtain a positive electrode.

An electrolyte used for the cell was a liquid electrolyte which was obtained by dissolving 1 mole of lithium phosphorus hexafluoride ($LiPF_6$) in 1000 ml of a mixed solvent of propylene carbonate (PC) and dimethoxyethane at a ratio by volume of 1:1.

A separator used was a 50 μm thick polypropylene finely porous film or sheet.

Using the positive electrode, negative electrode, separator and electrolyte as set out above, a lithium cell of the type shown in FIG. 1 was assembled. More particularly, a negative electrode i having a nickel mesh supporting the electrode 1 and serving as a current collector, a separator 3 impregnated with a liquid electrolyte, and a positive electrode 5 having a high chromium stainless steel mesh 6 supporting the positive electrode and serving as a current collector were put one on another, as shown, to provide a cell unit U. The unit U was encased in a casing made of a stainless steel cover 7 and a stainless steel case 8. The cover 7 was caulked with the case 8 and hermetically sealed with a gasket 9 to provide a test cell.

In order to assess the characteristic of the lithium nitridoferrate active substance, the cell was arranged so that the capacity for the negative electrode was extremely decreased as compared with that of the positive electrode.

Figure 5:
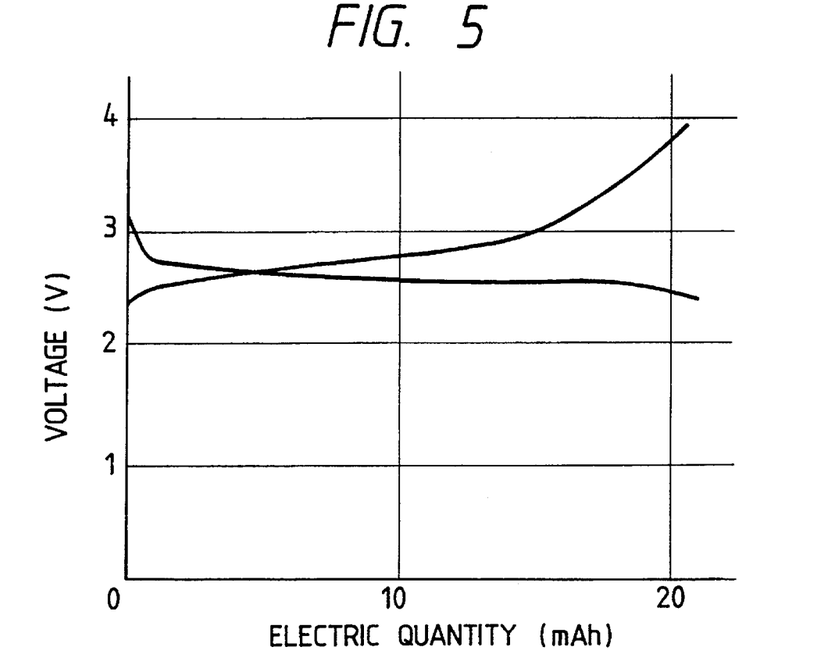
FIG. 5 is a graph showing charge and discharge curves of a lithium secondary cell fabricated in Example 1.

The lithium secondary cell was subjected to a charge and discharge cycle test at a current density of 100 μA. The charge and discharge curve of the cell is shown in FIG. 5.

When the charge and discharge cycle test was continued over 500 cycles, little variation was observed in the charge and discharge cycles.

For comparison, the above procedure was repeated except that spherical graphite was used as an active substance for the negative electrode.

The resultant cell was subjected to a charge and discharge cycle test in the same manner as stated above. As a result, it was found that at the end of the charge of the cell using the graphite as the negative electrode, the charge curve was disturbed, disabling the discharge. We broke up the cell and checked the reason why the cell did not work well, revealing that the electrolyte was extremely reduced in amount and a gas layer was formed on the surface of the negative electrode owing to the generation of the gas accompanied by the charge of the cell.

Subsequently, in order to eliminate the adverse influence of the gas generation, the cell for the comparison was preliminarily charged prior to the hermetic sealing, after which the cell was sealed to obtain another test cell.

This cell was also subjected to a charge and discharge cycle test, revealing that the charge and discharge capacity after 300 cycles was reduced to about 60% of an initial capacity.

From the above, it will be seen that the cell of the invention does not required any preliminary charging and exhibits good charge and discharge characteristics.

EXAMPLE 2

In this example, lithium nitrodoferrate was used as an active substance for positive electrode in a lithium secondary cell.

Lithium nitridoferrate was prepared in the same manner as in Example 1.

5 wt % of fibrous graphite and 1 wt % of a polytetrafluoroethylene binder were mixed with the lithium nitridoferrate to provide a positive electrode material. This material was packed in a high chromium stainless steel mesh disk with a diameter of 18 mm$\phi$ to obtain a positive electrode.

A metallic lithium foil was used as a negative electrode for the cell.

Moreover, a liquid electrolyte as used in Example 1 was used and a separator used was a 50 μm thick polypropylene finely porous film.

Using these material, a secondary lithium cell was assembled. In order to assess the characteristics of the lithium nitridoferrate active substance, the cell was so arranged for extreme regulation of positive electrode capacity as in Example 1.

Figure 6:
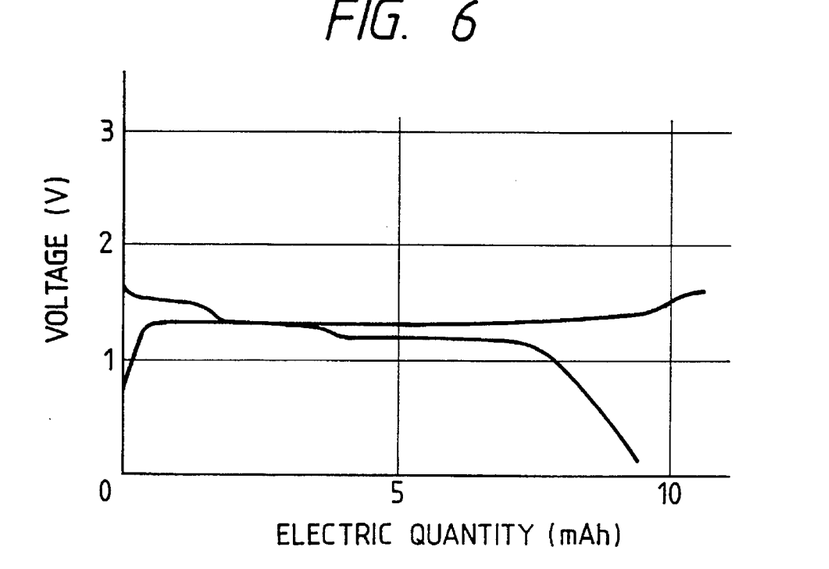
FIG. 6 is a graph showing charge and discharge curves of a lithium secondary cell fabricated in Example 2.

The cell was subjected to a charge and discharge cycle test in the same manner as in Example 1. The charge and discharge curve obtained by the test is shown in FIG. 6. The charge and discharge test was continued to 500 cycles, whereupon it was found that any significant variation took place in the charge and discharge curve. Thus, according to the invention, there could be obtained a lithium secondary cell having good charge and discharge cycles when using lithium nitridoferrate as the active substance for the positive electrode.

EXAMPLE 3

In this example, lithium nitridoferrate as used in the foregoing examples was used as an active substance for positive electrode and a lithium ion conductive solid electrolyte was used as a solid electrolyte, thereby providing a solid state lithium secondary cell.

More particularly, an amorphous lithium ion conductive solid electrolyte was prepared by mixing $Li_2S$ and $Si_2S$ at a molar ratio of 3:2 and melting the mixture in a stream of Ar, pouring the resultant melt by pouring into liquid nitrogen to obtain an amorphous lithium ion conductive solid electrolyte of the formula, $0.6Li_2S$-$0.4SiS_2$.

5 wt % of fibrous graphite was mixed with lithium nitridoferrate, to which 50 wt % of the solid electrolyte was added to obtain a positive electrode material for the secondary cell. 50 mg of the positive electrode material was packed in a high chromium stainless steel mesh disk with a diameter of 18 mm$\phi$ to obtain a positive electrode.

A metallic lithium foil was used as a negative electrode.

Using the positive electrode, negative electrode and electrolyte, a solid state lithium secondary cell having such a construction as shown in FIG. 4 was fabricated. In the figure, a positive electrode 10, a solid electrolyte layer 11 and a negative electrode 12 were arranged as shown in the figure to provide a cell unit U. Lead terminals 13, 14 were, respectively, attached to the positive and negative electrodes 10, 13 and fixed by means of a carbon paste 15. The cell U was encased in a cured epoxy resin 16.

The resultant solid state lithium secondary cell was subjected to a charge and discharge cycle test at a constant current of 100 μA. As a result, it was found that a significant variation did not take place in the charge and discharge curve up to 300 charge and discharge cycles. Thus there could be obtained the solid state lithium secondary cell having a good cycle characteristic according to the invention.

EXAMPLE 4

In this example, fabrication of an electrochemical display device using lithium nitridoferrate of $Li_3FeN_2$ as an active substance for electrode is illustrated.

Lithium nitridoferrate was prepared in the same manner as in Example 1.

The display device was arranged as shown in FIG. 3.

An indium tin oxide layer 18 was formed as a transparent electrode on a glass substrate 17 by an electron beam vacuum deposition method, on which a tungsten oxide layer 19 was formed as a display electrode according to an EB vapor deposition method.

In a glass case 22 attached with a lead terminal 20 by means of a glass solder 21, there was placed a counter electrode unit U1 which was mounted on the display electrode 19. The counter electrode unit U1 included a counter electrode 24 which was obtained by mixing 10 mg of lithium nitridoferrate, 5 mg of carbon powder and 2 mg of a polytetrafluoroethylene binder and press molding the mixture along with a stainless steel mesh 23, a porous ceramic sheet 25 used as a light reflector and an electrolyte 26. The electrolyte 26 consisted of a solution of 1 mole/liter of $LiClO_4$ in propylene carbonate. The unit U1 was sealed in the glass case 22 by use of a UV-cured resin 27.

The display device was subjected to a color-developing and bleaching cycle test wherein pulse voltages of +2.5 V (20 mseconds) and 0 V (200 mseconds) were applied to the device. As a result, it was found that the device stably worked at least up to $5 \times 10^5$ cycles.

For comparison, the above procedure was repeated except that tungsten bronze which was able to undergo topochemical reactions by application of pulse voltages was used in the counter electrode in place of lithium nitridoferrate, thereby making an electrochemical display device.

More particularly, tungsten bronze was prepared by reaction between tungsten oxide ($WO_3$) and n-butyl lithium by immersing tungsten oxide in n-butyl lithium diluted with cyclohexane portion by portion thereby causing $Li^+$ ions to be intercalated into the crystals of the tungsten oxide to obtain tungsten bronze of the formula, $LiWO_3$. Thereafter, the thus obtained tungsten bronze was washed with cyclohexane and dried under reduced pressure to obtain pure tungsten bronze.

The general procedure of Example 4 was repeated except that tungsten bronze was used in place of lithium nitridoferrate thereby obtaining an electrochemical display device.

The display device was subjected to a working cycle test in the same manner as set out hereinbefore. As a result, it was found that the color-developing and bleaching did not proceed stably after the 2000th cycle. In order to check the reason why the stable cycles did not proceed, the potential of the single electrode was measured during the course of the working cycles whereupon it was found that the potential of the counter electrode varied as the working cycles proceeded, not permitting the color-developing and bleaching to proceed stably.

Thus, it will be seen that the display device of the invention are better in the working cycle characteristic.

EXAMPLE 5

In this example, an electric double-layer capacitor is illustrated using lithium nitridoferrate.

In general, an electric double-layer capacitor can be broadly classified into two categories including a non-polar capacitor wherein both electrodes are polar in nature and a polar capacitor wherein one of electrodes is polar and the other is non-polar. In this example, a lithium nitride-metal compound is used as a non-polar electrode to provide a polar electric double-layer capacitor of the invention. For comparison, there are fabricated a polar electric double-layer capacitor using metallic lithium as a non-polar electrode and a non-polar electric double-layer capacitor not using any non-polar electrode.

Lithium nitridoferrate of the formula, $Li_3FeN_2$, as prepared and used in Example 1 was provided and mixed with 5 wt % of fibrous graphite and 1 wt % of a fluorine-containing resin binder to provide an electrode material for non-polar electrode. The thus obtained material was press rolled in a thickness of 100 μm, punched into a disk having a diameter of 18 mmφ and pressed in a high chrome stainless steel mesh to provide a disk-shaped non-polar electrode.

Separately, a high surface area carbon material was provided and mixed with 3 wt % of a fluorine-containing resin, followed by rolling to a thickness of 1 mm, punching into a disk having a diameter of 18 mmφ and packing the punched sheet in a high chromium stainless steel mesh to obtain a polar electrode.

Using the non-polar electrode and the polar electrode, an electric double-layer capacitor having such a structure as shown in FIG. 4 was fabricated in the following manner.

A non-polar electrode 28 having a high chromium stainless steel mesh therein and a polar electrode 32 having a high chromium stainless steel mesh 33 therein were superposed through a 100 μm thick separator 30. The separator 30 was impregnated with a liquid electrolyte which was composed of 1 mole/liter of $LiPF_6$ in a mixture of propylene carbonate and ethylene carbonate at a ratio by volume of 1:1. The resultant cell unit U2 was encased in a stainless steel cover 34 and a stainless steel case 35 which was sealed with a gasket 36 to obtain an electric double-layered capacitor.

The capacitor was subjected to a constant current charge and discharge cycle test at a constant current of 10 mA and a potential ranging from 0 V to +3 V. As a result, it was found that no variation in charge and discharge curve was observed after 10000 charge and discharge cycles.

For comparison, the general procedure of Example 5 was repeated except that there was used, instead of the non-polar electrode using lithium nitridoferrate, titanium disulfide having a layered structure which had been obtain by immersing titanium disulfide in a solution of n-butyl lithium in cyclohexane thereby permitting lithium ions to be intercalated in the layered structure of titanium disulfide ($LiTiS_2$), thereby obtaining a polar electric double-layered capacitor.

This capacitor was also subjected to a charge and discharge cycle test, whereupon it was found that the charge and discharge curve underwent an appreciable variation after about 4000 cycles.

Moreover, for comparison, a non-polar electric double-layer capacitor was made in the same manner as set out hereinabove except that both electrodes were made of a high surface area carbon material without use of any non-polar electrode. The capacitor was subjected to a charge and discharge cycle test. As a consequence, it was found that the capacity was lower than that of the polar electric double-layer capacitor of the example and also that of the polar electric double-layer capacitor for comparison using $LiTiS_2$.

Thus, it will be seen that the electric double-layer capacitor of the invention is better in the working cycle characteristic.

EXAMPLE 6

In this example, a lithium secondary cell was made using, as an active substance for negative electrode, lithium nitridoferrate of the formula, $Li_4FeN_2$, in place of $Li_3FeN_2$ used in Example 1.

$Li_4FeN_2$ was prepared by placing metallic lithium in an iron crucible, and heated and melted in a stream of nitrogen at 900° C., followed by continuation of the heating at 900° C. over 5 hours and casting the melt on a water-cooled iron plate to obtain $Li_4FeN_2$.

The general procedure of Example 1 was repeated except that $Li_4FeN_2$ was used.

The resultant cell was subjected to a charge and discharge test in the same manner as in Example 1. As a result, it was found that the charge and discharge voltages and capacities, respectively, changed on comparison with the cell of Example 1 and little change was observed in the charge and discharge curve up to 500 charge and discharge cycles. Thus, a good secondary cell was obtained.

EXAMPLE 7

The general procedure of Example 2 was repeated except that lithium nitridocobaltate of the formula, $Li_2CoN$, was used as an active substance for positive electrode, thereby obtaining a lithium secondary cell.

The cell was subjected to a charge and discharge cycle test in the same manner as in Example 2.

Figure 7:
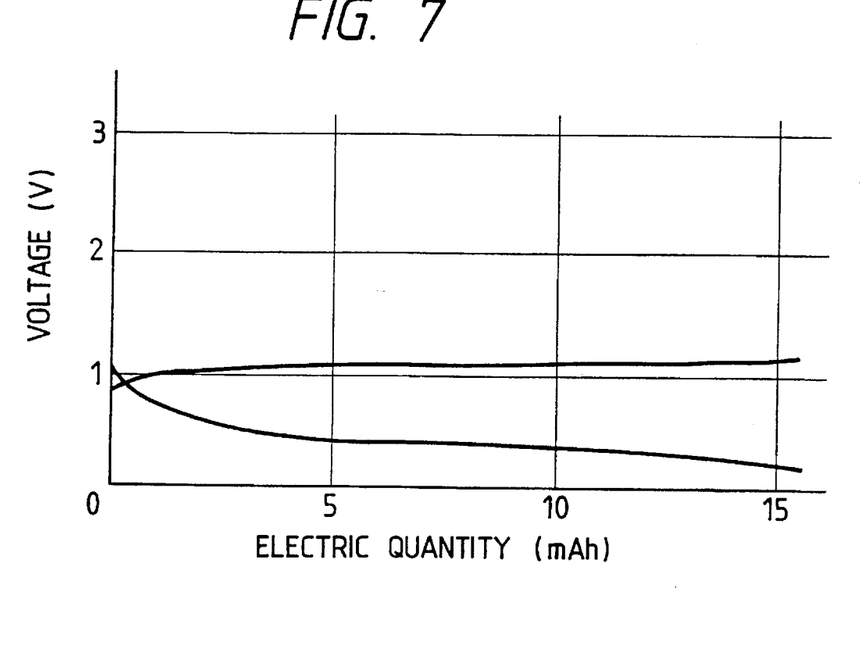
FIG. 7 is a graph showing charge and discharge curves of a lithium secondary cell fabricated in Example 7.

The charge and discharge curve is shown in FIG. 7. The charge and discharge voltages and capacities changed on comparison with the cell of Example 2 and little appreciable variation was found in the charge and discharge curve up to 500 charge and discharge cycles. Thus, the cell had a good charge and discharge cycle characteristic.

EXAMPLE 8

The general procedure of Example 2 was repeated except that two types of lithium nitridocobaltate compounds of the formula, $Li_{2+x}Co_{1-x}N$ wherein x=0.25 and 0.40, were, respectively, used as an active substance for positive electrode, thereby obtaining lithium secondary cells.

These compounds were prepared by mixing metallic lithium and metallic cobalt at a molar ratio of 2+x:1−x and heated in a stream of nitrogen.

The cells were, respectively, subjected to a charge and discharge cycle test in the same manner as in Example 2.

Figure 8:
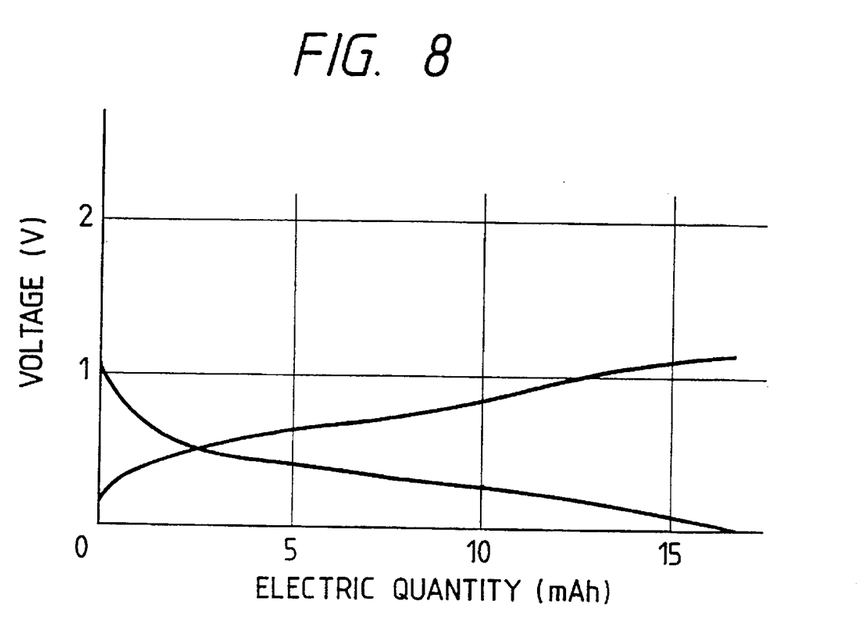
FIG. 8 is a graph showing charge and discharge curves of a lithium secondary cell fabricated in Example 8 using $Li_{2+x}Co_{1-x}N$ wherein x=0.25.
Figure 9:
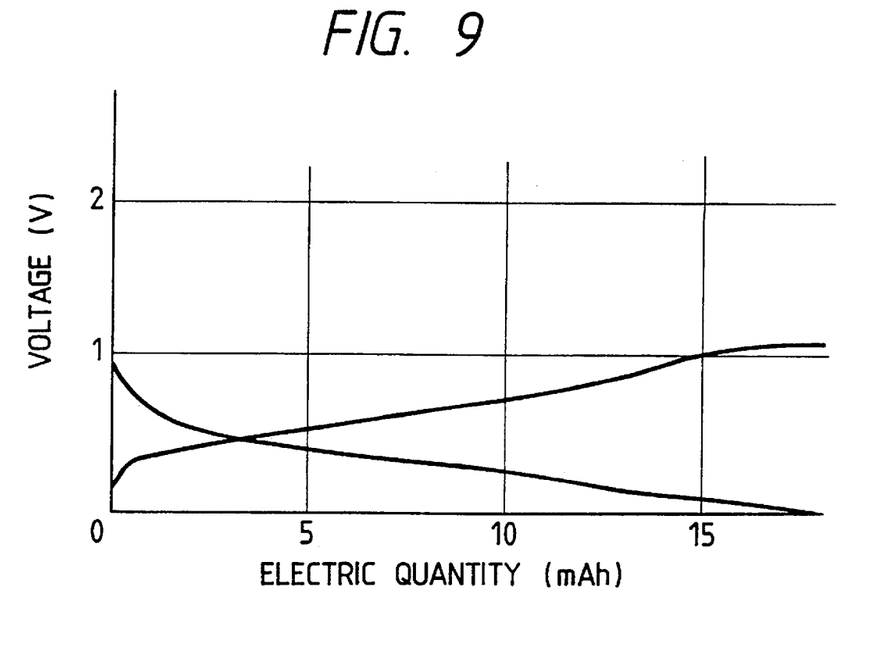
FIG. 9 is a graph showing charge and discharge curves of a lithium secondary cell fabricated in Example 8 using $Li_{2+x}Co_{1-x}N$ wherein x=0.40.

The charge and discharge curve is shown in FIG. 8 for the above formula wherein x=0.25 and in FIG. 9 for the formula wherein x=0.40.

The charge and discharge voltages and capacities changed on comparison with those values of the cell of Example 2 and of the cell of Example 7. When the charge and discharge cycle test was continued up to 500 cycles, little variation was found in the charge and discharge curve. Thus, the cells of this example had, respectively, a good charge and discharge cycle characteristic.

EXAMPLE 9

The general procedure of Example 2 was repeated except that lithium nitridocuprate of the formula, $Li_2CuN$, was used as an active substance for positive electrode, thereby obtaining a lithium secondary cell.

The cell was subjected to a charge and discharge test in the same manner as in Example 2.

Figure 10:
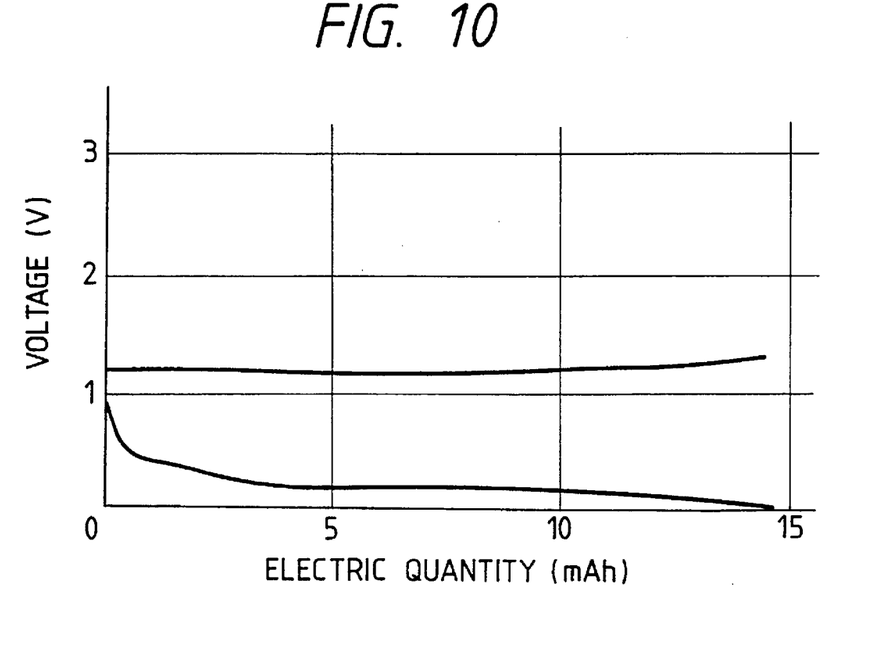
FIG. 10 is a graph showing charge and discharge curves of a lithium secondary cell fabricated in Example 9.

The charge and discharge curve is shown in FIG. 10. As will be apparent from FIG. 10, the charge and discharge voltages and capacities changed when compared with those of the cell of Example 2. When the cycle test was continued up to 500 cycles, any appreciable change was not found in the charge and discharge curve. Thus, the cell of the invention had a good charge and discharge cycle characteristic.

EXAMPLE 10

The general procedure of Example 2 was repeated except that lithium nitridomanganate of the formula, $Li_3MnN_2$, was used as an active substance for positive electrode, thereby obtaining a lithium secondary cell.

The cell was subjected to a charge and discharge test in the same manner as in Example 2.

Figure 11:
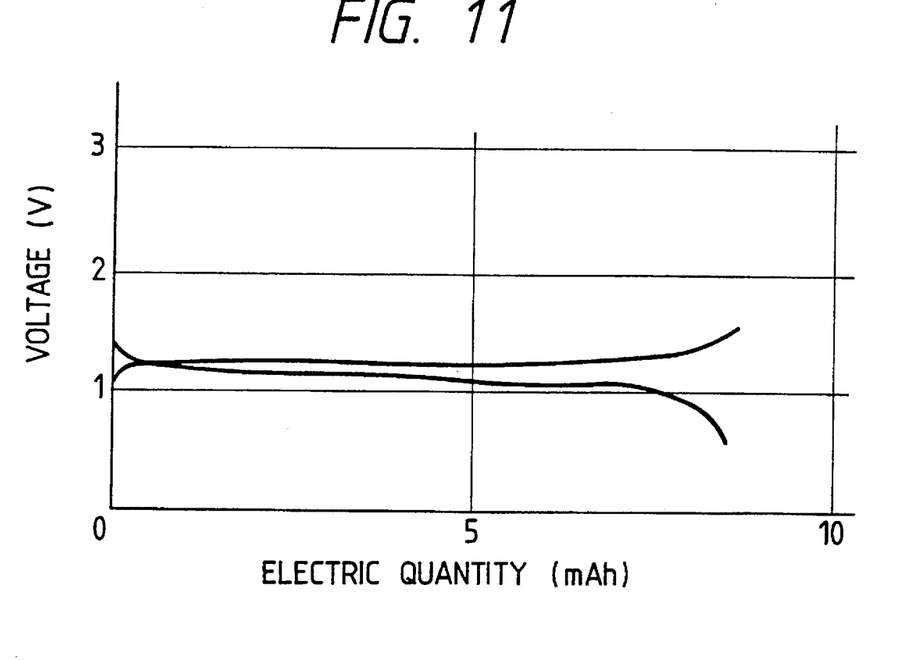
FIG. 11 is a graph showing charge and discharge curves of a lithium secondary cell fabricated in Example 10.

The charge and discharge curve is shown in FIG. 11. As will be apparent from FIG. 11, the charge and discharge voltages and capacities changed when compared with those of the cell of Example 2. When the cycle test was continued up to 500 cycles, any appreciable change was not found in the charge and discharge curve. Thus, the cell of the invention had a good charge and discharge cycle characteristic.

EXAMPLE 11

The general procedure of Example 2 was repeated except that lithium nitridomanganate of the formula, $Li_5MnN_3$, was used as an active substance for positive electrode, thereby obtaining a lithium secondary cell.

The cell was subjected to a charge and discharge test in the same manner as in Example 2.

Figure 12:
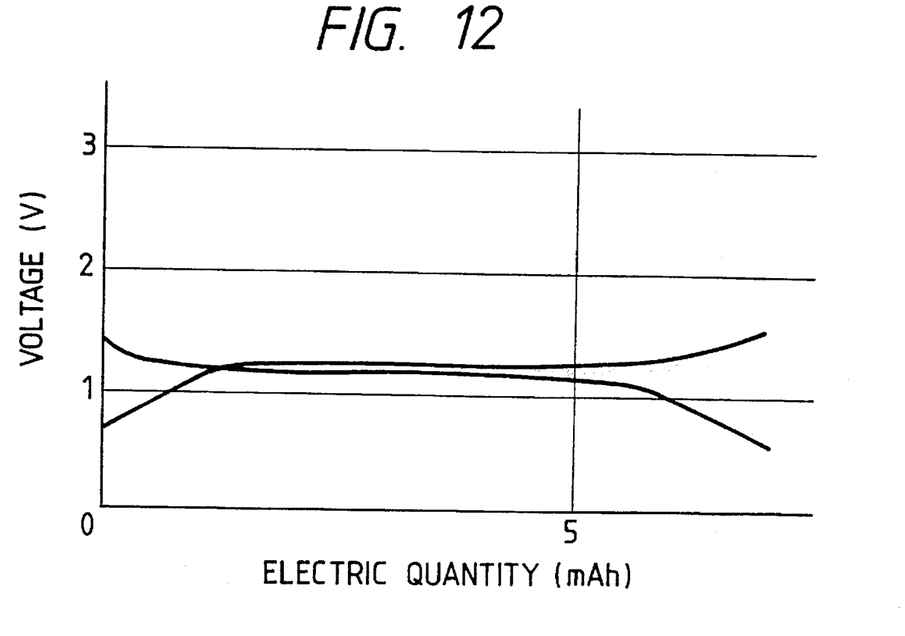
FIG. 12 is a graph showing charge and discharge curves of a lithium secondary cell fabricated in Example 11.

The charge and discharge curve is shown in FIG. 12. As will be apparent from FIG. 12, the charge and discharge voltages and capacities changed when compared with those of the cell of Example 2. When the cycle test was continued up to 500 cycles, any appreciable change was not found in the charge and discharge curve. Thus, the cell of the invention had a good charge and discharge cycle characteristic.

EXAMPLE 12

The general procedure of Example 2 was repeated except that lithium nitridonickelate of the formula, $Li_2NiN$, was used as an active substance for positive electrode, thereby obtaining a lithium secondary cell.

The cell was subjected to a charge and discharge test in the same manner as in Example 2.

The charge and discharge voltages and capacities changed when compared with those of the cell of Example 2. When the cycle test was continued up to 500 cycles, any appreciable change was not found in the charge and discharge curve. Thus, the cell of the invention had a good charge and discharge cycle characteristic.

EXAMPLE 13

The general procedure of Example 1 was repeated except that a lithium nitride compound of the formula, $Li_3Sr_3Ni_4N_4$, was used as an active substance for negative electrode, thereby obtaining a lithium secondary cell.

The cell was subjected to a charge and discharge test in the same manner as in Example 1.

The charge and discharge voltages and capacities changed when compared with those of the cell of Example 1. When the cycle test was continued up to 500 cycles, any appreciable change was not found in the charge and discharge curve. Thus, the cell of the invention had a good charge and discharge cycle characteristic.

EXAMPLE 14

The general procedure of Example 2 was repeated except that lithium nitridomanganate of the formula, $Li_7MnN_4$, was used as an active substance for positive electrode, thereby obtaining a lithium secondary cell.

The cell was subjected to a charge and discharge test in the same manner as in Example 2. The charge and discharge voltages and capacities changed when compared with those of the cell of Example 2. When the cycle test was continued up to 500 cycles, any appreciable change was not found in the charge and discharge curve. Thus, the cell of the invention had a good charge and discharge cycle characteristic.

EXAMPLE 15

The general procedure of Example 2 was repeated except that lithium nitridochromate of the formula, $Li_6CrN_4$, was used as an active substance for positive electrode, thereby obtaining a lithium secondary cell.

The cell was subjected to a charge and discharge test in the same manner as in Example 2. The charge and discharge voltages and capacities changed when compared with those of the cell of Example 2. When the cycle test was continued up to 500 cycles, any appreciable change was not found in the charge and discharge curve. Thus, the cell of the invention had a good charge and discharge cycle characteristic.

EXAMPLE 16

The general procedure of Example 2 was repeated except that lithium nitridovanadate of the formula, $Li_7VN_4$, was used as an active substance for positive electrode, thereby obtaining a lithium secondary cell.

The cell was subjected to a charge and discharge test in the same manner as in Example 2. The charge and discharge voltages and capacities changed when compared with those of the cell of Example 2. When the cycle test was continued up to 500 cycles, any appreciable change was not found in the charge and discharge curve. Thus, the cell of the invention had a good charge and discharge cycle characteristic.

EXAMPLE 17

The general procedure of Example 2 was repeated except that lithium nitridomolybdate of the formula, $Li_6MoN_4$, was used as an active substance for positive electrode, thereby obtaining a lithium secondary cell.

The cell was subjected to a charge and discharge test in the same manner as in Example 2. The charge and discharge voltages and capacities changed when compared with those of the cell of Example 2. When the cycle test was continued up to 500 cycles, any appreciable change was not found in the charge and discharge curve. Thus, the cell of the invention had a good charge and discharge cycle characteristic.

In the foregoing examples, the metals used to form lithium nitride-metal compounds include Fe, Co, Cu, Mn, Cr, V and Mo. W and Nb are also used for this purpose. Similar results are obtained when using multi-component lithium nitride-transition metal compounds.

What is claimed is:

1. A lithium secondary cell which comprises a cell unit including a pair of electrodes, a separator provided between said pair of electrodes, and a liquid electrolyte impregnated in said separator and capable of lithium ion concentration, wherein at least one of said pair of electrodes comprises a lithium nitride-metal compound which contains at least one metal selected from the group consisting of Co, Cu, Cr, V, Sr, Ni, W and Nb.

2. A lithium secondary cell according to claim 1, wherein said at least one electrode consists essentially of said lithium nitride-metal compound.

3. A lithium secondary cell according to claim 1, wherein sid at least one electrode is made of a composition which comprises said lithium nitride-metal compound, up to 20 wt % of a conductive material and up to 20 wt % of a resin binder.

4. A lithium secondary cell according to claim 1, wherein said conductive material is present in an amount of from 2 to 15 wt % and said resin binder is present in an amount of from 2 to 15 wt %.

5. A lithium secondary cell according to claim 1, wherein one of said pair of electrodes comprises said lithium nitride-metal compound.

6. A lithium secondary cell according to claim 1, wherein both electrodes of said pair of electrodes comprise said lithium nitride-metal compound.

7. A lithium secondary cell according to claim 1, wherein said electrolyte comprises lithium phosphorus hexafluoride of the formula, $LiPF_6$ as a solute.

8. A solid state lithium secondary cell which comprises a cell unit including a pair of electrodes, and a solid electrolyte layer capable of lithium ion conduction and provided between said pair of electrodes, wherein at least one of said pair of electrodes comprises a lithium nitride-metal compound which contains at least one metal selected from the group consisting of Co, Cu, Cr, V, Mo, Sr, Ni, W and Nb.

9. A solid state lithium secondary cell according to claim 8, wherein said at least on electrode consists essentially of said lithium nitride-metal compound.

10. A solid state lithium secondary cell according to claim 8, wherein said at least one electrode is made of a composition which comprises said lithium nitride-metal compound, up to 20 wt % of a conductive material and up to 20 wt % of a said solid electrolyte.

11. A solid state lithium secondary cell according to claim 8, wherein one of said pair of electrodes comprises said lithium nitride-metal compound.

12. A solid state lithium secondary cell according to claim 8, wherein both electrodes of said pair of electrodes comprise said lithium nitride-metal compound.

13. An electrochemical display device which comprises an electrically insulating substrate, a transparent electrode and a display electrode formed on said electrically insulating substrate in this order, and a counter electrode associated with the display electrode through an electrolyte and capable of color development or bleaching on application of pulse voltages, wherein said counter electrode comprises a lithium nitride-metal compound which contains at least one metal selected from the group consisting of Co, Cu, Cr, V, Mo, Sr, Ni, W and Nb.

14. An electrochemical display device according to claim 13, wherein said counter electrode consists essentially of said lithium nitride-metal compound.

15. An electrochemical display device according to claim 13, wherein said counter electrode is made of a composition which comprises said lithium nitride-metal compound, up to 20 wt % of a conductive material and up to 20 wt % of a resin binder.

16. An electrochemical display device according to claim 13, wherein said counter electrode consists essentially of $Li_3FeN_2$.

17. An electrochemical display device according to claim 13, wherein said electrolyte comprises $LiClO_4$ as a solute.

18. An electric double layer capacitor which comprises a unit including a non-polar electrode, a polar electrode spaced apart from the non-polar electrode, a separator provided between the non-polar electrode and the polar electrode, and an electrolyte impregnated in the separator and capable of lithium ion concentration, wherein the non-polar electrode comprises a lithium nitride-metal compound which contains at least one metal selected from the group consisting of Co, Cu, Cr, V, Mo, Sr, Ni, W and Nb.

19. An electric double layer capacitor according to claim 18, wherein said non-polar electrode consists essentially of said lithium nitride-metal compound.

20. An electric double layer capacitor according to claim 18, wherein said non-polar electrode is made of a composition which comprises said lithium nitride-metal compound, up to 20 wt % of a conductive material and up to 20 wt % of a resin binder.

21. An electrochemical device which comprises at least a pair of electrodes and a lithium ion conductive electrolyte provided between said pair of electrodes, wherein at least one of said pair of electrodes comprises a lithium nitride-metal compound which contains at least one metal selected from the group consisting of Co, Cu, Cr, V, Mo, Sr, Ni, W and Nb.

22. An electrochemical device according to claim 21, wherein said at least one electrode consists essentially of said lithium nitride-metal compound.

23. An electrochemical device according to claim 21, wherein said at least one electrode is made of a composition which comprises said lithium nitride-metal compound, up to 20 wt % of a conductive material, and up to 20 wt % of a resin binder.

24. An electrochemical device according to claim 23, wherein said conductive material is present in an amount of from 2 to 15 wt % and said resin binder is present in an amount of from 2 to 15 wt %.

25. An electrochemical device according to claim 21, wherein one of said pair of electrodes comprises said lithium-metal compound.

26. An electrochemical device according to claim 21, wherein each of said pair of electrodes comprise said lithium-metal compound.

27. A lithium secondary cell which comprises a cell unit including a pair of electrodes, a separator provided between said pair of electrodes, and a liquid electrolyte impregnated in said separator and capable of lithium ion conduction, wherein at least one of said pair of electrodes comprises a lithium nitride-metal compound selected from the group consisting of $LiFeN_2$, $Li_3MnN_2$ and $Li_5MnN_3$.

28. A lithium secondary cell according to claim 27, wherein said at least one electrode consists essentially of said lithium nitride-metal compound.

29. A lithium secondary cell according to claim 27, wherein said at least one electrode is made of a composition which comprises said lithium nitride-metal compound, up to 20 wt % of a conductive material, and up to 20 wt % of a resin binder.

30. A lithium secondary cell according to claim 27, wherein one of said pair of electrodes comprises said lithium nitride-metal compound.

31. A lithium secondary cell according to claim 27, wherein both electrodes of said pair of electrodes comprises said lithium nitride-metal compound.

32. A solid state lithium secondary cell which comprises a cell unit including a pair of electrodes, and a solid electrolyte layer capable of lithium ion conduction and provided between said pair of electrodes, wherein at least one of said pair of electrodes comprises a lithium nitride-metal compound selected from the group consisting of $LiFeN_2$, $Li_3MnN_2$ and $Li_3MnN_3$.

33. A solid state lithium secondary cell according to claim 32, wherein said at least one electrode consists essentially of said lithium nitride-metal compound.

34. A solid state lithium secondary cell according to claim 32, wherein said at least one electrode is made of a composition which comprises said lithium nitride-metal compound, up to 20 wt % of a conductive material, and up to 20 wt % of a resin binder.

35. A solid state lithium second cell according to claim 32, wherein one of said pair of electrodes comprises said lithium nitride-metal compound.

36. A solid state lithium second cell according to claim 32, wherein both electrodes of said pair of electrodes comprises said lithium nitride-metal compound.

37. An electrochemical device which comprises at least a pair of electrodes and a lithium ion conductive electrolyte provided between said pair of electrodes, wherein at least one of said pair of electrodes comprises a lithium nitride-metal compound selected from the group consisting of $LiFeN_2$, $Li_3MnN_2$ and $Li_5MnN_3$.

38. An electrochemical device according to claim 37, wherein said at least one electrode consists essentially of said lithium nitride-metal compound.

39. An electrochemical device according to claim 37, wherein said at least one electrode is made of a composition which comprises said lithium nitride-metal compound, up to 20 wt % of a conductive material, and up to 20 wt % of a resin binder.

40. An electrochemical device according to claim 37, wherein each of said pair of electrodes comprises said lithium nitride-metal compound.

41. An electrochemical device according to claim 37, wherein said lithium nitride-metal compound consists of $Li_3FeN_2$.

42. An electrochemical device according to claim 37, wherein said lithium nitride-metal compound consists of $Li_3MnN_2$.

43. A lithium secondary cell which comprises a cell unit including a pair of electrodes, a separator provided between said pair of electrodes, and a liquid electrolyte impregnated in said separator and capable of lithium ion concentration, wherein at least one of said pair of electrodes comprises a lithium nitride-metal compound selected from the group consisting of $LiFeN_2$, $Li_3MnN_2$ and $Li_5MnN_3$.

44. An electrochemical device according to claim 43, wherein said at least one electrode consists essentially of said lithium nitride-metal compound.

45. An electrochemical device according to claim 43, wherein said at least one electrode is made of a composition which comprises said lithium nitride-metal compound, up to 20 wt % of a conductive material, and up to 20 wt % of a resin binder.

46. An electrochemical device according to claim 43, wherein each of said pair of electrodes comprises said lithium nitride-metal compound.

47. An electrochemical device according to claim 43, wherein said lithium nitride-metal compound consists of $Li_3FeN_2$.

48. An electrochemical device according to claim 43, wherein said lithium nitride-metal compound consists of $Li_3MnN_2$.

49. A solid state lithium secondary cell which comprises a cell unit including a pair of electrodes, and a solid electrolyte layer capable of lithium ion conduction and provided between said pair of electrodes, wherein at least one of said pair of electrodes comprises a lithium nitride-metal compound selected from the group consisting of $LiFeN_2$, $Li_3MnN_2$ and $Li_5MnN_3$.

50. An electrochemical device according to claim 49, wherein said at least one electrode consists essentially of said lithium nitride-metal compound.

51. An electrochemical device according to claim 49, wherein said at least one electrode is made of a composition which comprises said lithium nitride-metal compound, up to 20 wt % of a conductive material, and up to 20 wt % of a resin binder.

52. An electrochemical device according to claim 49, wherein each of said pair of electrodes comprises said lithium nitride-metal compound.

53. An electrochemical device according to claim 49, wherein said lithium nitride-metal compound consists of $Li_3FeN_2$.

54. An electrochemical device according to claim 49, wherein said lithium nitride-metal compound consists of $Li_3MnN_2$.

55. An electrochemical display device which comprises an electrically insulating substrate, a transparent electrode and a display electrode formed on said electrically insulating substrate in this order, and a counter electrode associated with the display electrode through an electrolyte and capable of color development or bleaching on application of pulse voltages, wherein said counter electrode comprises a lithium nitride-metal compound selected from the group consisting of $LiFeN_2$, $Li_3MnN_2$ and $Li_5MnN_3$.

56. An electrochemical device according to claim 55, wherein said at least one electrode consists essentially of said lithium nitride-metal compound.

57. An electrochemical device according to claim 55, wherein said at least one electrode is made of a composition which comprises said lithium nitride-metal compound, up to 20 wt % of a conductive material, and up to 20 wt % of a resin binder.

58. An electrochemical device according to claim 55, wherein each of said electrodes comprises said lithium nitride-metal compound.

59. An electrochemical device according to claim 55, wherein said lithium nitride-metal compound consists of $Li_3FeN_2$.

60. An electrochemical device according to claim 55, wherein said lithium nitride-metal compound consists of $Li_3MnN_2$.

61. An electric double layer capacitor which comprises a unit including a non-polar electrode, a polar electrode spaced apart from the non-polar electrode, a separator provided between the non-polar electrode and the polar electrode, and an electrolyte impregnated in the separator and capable of lithium ion concentration, wherein the non-polar electrode comprises a lithium nitride-metal compound selected from the group consisting of $LiFeN_2$, $Li_3MnN_2$ and $Li_5MnN_3$.

62. An electrochemical device according to claim 61, wherein said at least one electrode consists essentially of said lithium nitride-metal compound.

63. An electrochemical device according to claim 61, wherein said at least one electrode is made of a composition which comprises said lithium nitride-metal compound, up to 20 wt % of a conductive material, and up to 20 wt % of a resin binder.

64. An electrochemical device according to claim 61, wherein each of said electrodes comprises said lithium nitride-metal compound.

65. An electrochemical device according to claim 61, wherein said lithium nitride-metal compound consists of $Li_3FeN_2$.

66. An electrochemical device according to claim 61, wherein said lithium nitride-metal compound consists of $Li_3MnN_2$.

* * * * *